(12) United States Patent
Jaggard et al.

(10) Patent No.: US 10,648,565 B2
(45) Date of Patent: May 12, 2020

(54) AIRCRAFT SEAL ASSEMBLY

(71) Applicant: Airbus Operations Limited, Bristol (GB)

(72) Inventors: Philip Jaggard, Bristol (GB); Alan Haddrell, Bristol (GB); James Buckingham, Bristol (GB)

(73) Assignee: Airbus Operations Limited, Bristol (GB)

( * ) Notice: Subject to any disclaimer, the term of this patent is extended or adjusted under 35 U.S.C. 154(b) by 31 days.

(21) Appl. No.: 15/845,160

(22) Filed: Dec. 18, 2017

(65) Prior Publication Data
US 2018/0172159 A1 Jun. 21, 2018

(30) Foreign Application Priority Data
Dec. 19, 2016 (GB) .................................. 1621606.1

(51) Int. Cl.
| | |
|---|---|
| *F16J 15/16* | (2006.01) |
| *B64C 9/02* | (2006.01) |
| *B64C 7/00* | (2006.01) |
| *B64C 9/14* | (2006.01) |

(52) U.S. Cl.
CPC .............. *F16J 15/164* (2013.01); *B64C 7/00* (2013.01); *B64C 9/02* (2013.01); *B64C 9/14* (2013.01)

(58) Field of Classification Search
CPC . F16J 15/164; F16J 15/46; F16J 15/48; B64C 7/00; B64C 9/02; B64C 9/14
See application file for complete search history.

(56) References Cited

U.S. PATENT DOCUMENTS

| | | | |
|---|---|---|---|
| 5,277,384 A * | 1/1994 | Webb | B64C 1/1492 244/121 |
| 5,749,546 A * | 5/1998 | Blackner | B64C 3/50 244/215 |
| 5,979,828 A | 11/1999 | Gruensfelder et al. | |
| 9,567,064 B2 * | 2/2017 | Schlipf | B64C 9/02 |
| 2009/0184208 A1 | 7/2009 | West | |
| 2010/0327121 A1 | 12/2010 | McAlinden et al. | |
| 2014/0048656 A1 * | 2/2014 | Schlipf | B64C 9/02 244/214 |
| 2015/0266563 A1 | 9/2015 | Zeon et al. | |
| 2016/0186866 A1 | 6/2016 | Foster et al. | |
| 2019/0054998 A1 * | 2/2019 | Best | B64C 1/38 |

FOREIGN PATENT DOCUMENTS

| | | |
|---|---|---|
| GB | 1144231 | 3/1969 |
| GB | 1546081 | 5/1979 |

OTHER PUBLICATIONS

Combined Search and Examination Report for GB1621606.1, dated Jun. 13, 2017, 7 pages.

* cited by examiner

*Primary Examiner* — Gilbert Y Lee
(74) *Attorney, Agent, or Firm* — Nixon & Vanderhye P.C.

(57) ABSTRACT

An aircraft assembly may have a drag-inducing discontinuity 112. A seal assembly 101 includes a seal body 110 arranged to fair and/or seal the discontinuity 112; and a sealed chamber 114, wherein the sealed chamber 114 being pressurised such that in response to changes in the ambient pressure relative to the internal pressure of the chamber 114 the sealed chamber 114 alters the behaviour of the seal body 110.

22 Claims, 6 Drawing Sheets

AIRCRAFT SEAL ASSEMBLY

RELATED APPLICATION

This application claims priority to United Kingdom (GB) 1621606.1 filed Dec. 19, 2016, the entire contents of each of which is incorporated by reference.

BACKGROUND OF THE INVENTION

The present invention concerns seals for use on an aircraft. More particularly, but not exclusively, this invention concerns seals for reducing the aerodynamic drag created by an aerodynamic step, gap or other discontinuity formed between a stationary and moveable element of the aircraft. The invention also concerns an aircraft assembly including such a seal and a method of altering the behaviour of a seal.

In order to reduce the drag generated by a discontinuity in an aircraft surface it is known to arrange a seal to fair (i.e. shield from airflow) or seal (i.e. close off) the discontinuity. For example, a seal blade may be arranged to shield an aerodynamic step, or a seal bulb may be arranged to fill an aerodynamic gap. The performance of a seal at cruise altitude may be of particular interest in view of the time spent by the aircraft at such altitudes. Accordingly, it would be advantageous to provide a seal that gives an improved aerodynamic performance, particularly at cruise altitudes.

Drag reduction using such a seal becomes more difficult when an element defining the discontinuity moves during flight. This may occur when a seal is used with a high-lift device such as a flap or slat or a control surface. In this case, the geometry of the discontinuity may change during flight, and/or the size of any seal may be limited by the need to maintain a minimum clearance so as to allow for the movement of the high-lift device or control surface and/or to prevent the seal becoming entrapped by the high-lift device or control surface. It would be advantageous to provide a seal for use with a moveable element that gives an improved aerodynamic performance and/or reduces the risk of seal entrapment.

FIG. 1 shows an example prior art seal 1 located between a flap 6 on the downstream (right-hand) side and a surface panel 8 on the upstream (left-hand) side. The seal 1 comprises a bulb 2 which appears as a semi-circle when viewed in cross-section in FIG. 1, with the curved portion of the semi-circle on the lower side. A blade 4 extends tangentially rearwards and downwards from the lower edge of the bulb 2. The seal 1 is attached to the rearmost edge of the upstream panel 8 with the body of the seal extending rearwards (towards the right hand side of FIG. 1). A portion of the flap 6 is located in the space above the upper surface of the blade 4 and adjacent the lower surface of the bulb 2.

In use, as the flap 6 is extended and retracted during flight the flap 6 moves relative to panel 8 and seal 1. In flight, as the flap 6 is retracted the front edge of the flap moves closer to and contacts the bulb 2. The force exerted by the flap 6 on the bulb 2 compresses and rotates the bulb 2, said rotation causes the blade 4 to move upwards towards the underside of the flap 6 as the flap moves towards the retracted position. To reduce the risk of the seal 1 becoming trapped between the flap 6 and panel 8, the blade 4 is angled down away from the underside of the flap 4. However, the more the blade 4 is set down from the underside of the bulb 2, the greater the distance between the blade 4 and flap 6 when the flap 6 is retracted, and the less effective the seal 1 is at reducing drag in flight. It would be advantageous to provide a seal that combines a lower entrapment risk with an improved aerodynamic performance.

The present invention seeks to mitigate the above-mentioned problems. Alternatively or additionally, the present invention seeks to provide an improved seal assembly for an aircraft.

SUMMARY OF THE INVENTION

In a first aspect, the present invention provides an aircraft assembly having a drag-inducing discontinuity, and a seal assembly comprising a seal body arranged to fair and/or seal said discontinuity, the seal assembly further comprising a sealed chamber, the sealed chamber being pressurised such that in response to changes in the ambient pressure relative to the internal pressure of the chamber the sealed chamber alters the behaviour of the seal body.

As ambient pressure will change with aircraft altitude, providing a seal assembly including a chamber configured to maintain a pressure difference with respect to the ambient pressure may allow the behaviour of the seal to change with altitude. For example, the behaviour of the seal may be changed to accommodate changes in the position of control surfaces at different altitudes, for example between take-off and cruise. Additionally or alternatively, providing a seal including a sealed chamber may allow the behaviour of the seal to be altered passively.

An alteration of the behaviour of the seal body may comprise an alteration of the shape, position and/or properties (for example stiffness) of the seal body.

The difference between the internal pressure of the chamber and the ambient pressure may be referred to as the pressure difference. The sealed chamber may be pressurised such that a pressure difference develops as the aircraft gains altitude. The chamber may be sealed such that air cannot flow into or out of the chamber while the aircraft is in flight. Thus, the chamber may be air-tight. The chamber may be sealed such that the chamber can be pressurised at ground level and no further provision of air to the chamber is required during flight in order to maintain a pressure difference.

It may be that the volume of the chamber varies in response to changes in the ambient pressure relative to the internal pressure of the chamber and said variation in volume alters the behaviour of the seal body. Providing a chamber that expands and/or contracts in response to a change in pressure difference may facilitate designs in which the pressure difference can be used to displace and/or deform the seal. The seal assembly may be configured such that a change in volume of the chamber generates a force that is exerted on the seal body to alter the behaviour of the seal body.

The structure defining the chamber may be configured such that the volume of the chamber varies in response to a change in the pressure difference. The chamber may be configured such that it returns to its original volume in the absence of a pressure difference. The structure defining the chamber may comprise one or more chamber walls, the inner surface of which defines the chamber. A chamber wall may be solid or flexible. It may be that at least one chamber wall is flexible and/or flexibly connected to the other chamber walls. Thus, the chamber (or the structure defining said chamber) may be flexible (at least in part). The chamber may be sub-divided by one or more internal walls. The seal assembly may comprise a plurality of sealed chambers. Each of the plurality of sealed chambers may be configured to respond to a change in pressure difference in the same way.

The sealed chamber may be located within the seal body. The chamber may be defined, at least in part, by the seal body. The structure defining the sealed chamber may comprise the seal body. For example, where the seal body includes a bulb, the bulb may be air-tight. Thus, the sealed chamber may comprise a sealed bulb of the seal body. Alternatively, the chamber may be located within the seal body, but defined by a structure separate from the seal body. The sealed chamber may be defined, at least in part, by a structure located within a void in the seal body.

The sealed chamber may be defined by a structure formed separately from the seal body. The structure defining the chamber may be located adjacent to the seal body such that, in use, said structure is in direct contact with the seal body for at least part of a flight. The structure defining the chamber may be spaced apart from the seal body such that there is no direct contact between the structure defining the chamber and the seal body. A linking mechanism may connect the structure defining the sealed chamber with the seal body such that the pressure difference causes a change in the behaviour of the seal. The linking mechanism may be configured to transmit a movement of the structure defining the chamber to the seal body.

The seal body may be flexible. The seal may be non-rigid. The seal assembly may be configured such that the seal body returns to its original behaviour in the absence of a pressure difference. The seal assembly may be configured such that the seal body returns to its original shape and/or position in the absence of a pressure difference. The seal body may be elastically deformable. The seal body may be made from an elastomeric material, for example silicon rubber. The seal body may comprise one or more reinforcing materials.

A seal assembly may be said to 'fair' a discontinuity when at least a portion of the seal body acts to shield the discontinuity from the air flow over the surface of the aircraft. A seal assembly may be said to 'seal' a discontinuity when at least a portion of the seal body closes off and/or covers over the discontinuity.

The seal body may have a wide variety of geometries. The seal body may comprise a bulb. The bulb may comprise one or more walls which define an internal cavity. The bulb may have an ovoid or semi-ovoid cross-section. The seal body may comprise a blade. The blade may comprise an elongate member, for example a flange. The seal body may comprise a bulb and one or more blade.

The discontinuity may comprise an aerodynamic gap and/or step. The bulb of a seal body may be configured to seal an aerodynamic gap by being located in the gap so as to close-off the gap. The bulb of a seal body may be configured to fair an aerodynamic discontinuity by being located adjacent the discontinuity so as to shield the discontinuity. The blade of a seal body may be configured to fair a discontinuity by being located adjacent the discontinuity so as to shield the discontinuity from the airflow. The blade of a seal body may be configured to seal an aerodynamic gap by being arranged so as to close-off the gap.

The seal assembly may be configured such that the change in volume of the chamber causes a displacement of at least a portion of the seal body. The change in volume may comprise an expansion and/or a contraction. The change in volume may cause a displacement of the whole or part of the seal body. The change in volume may cause a displacement of at least a portion of the seal body between a first position and a second position. The seal body may provide increased drag reduction in the second position as compared to the first position. It may be that a portion of the seal body is closer to the discontinuity in the second position than in the first position. For example, said portion may be spaced apart from the discontinuity in the first position and in contact with the discontinuity in the second position. The change in volume may cause a portion of the seal to move towards the structure defining the discontinuity, for example into contact with a portion of said structure. It may be that a larger portion of the seal body is arranged to fair a discontinuity in the second position as compared to the first discontinuity. The displacement may comprise a translation and/or a rotation of the seal body relative to the discontinuity.

The displacement of the perimeter of the chamber in response to a given pressure difference may be constant around the perimeter of the chamber. For example, a chamber may be defined by a side wall having constant material properties such that the chamber expands by the same amount in all radial directions in response to a given pressure differential across the side wall.

The displacement of the perimeter of the chamber in response to a given pressure difference may vary around the perimeter of the chamber. Providing a chamber that deforms anisotropically may allow a change in pressure difference to generate a larger displacement in a particular direction, thereby increasing the degree of deformation and/or displacement of the seal that can be achieved for a given pressure difference. The chamber may be configured such that a first chamber wall (or a first portion of a chamber wall) moves by a first amount and a second chamber wall (or a second portion of a chamber wall) moves by a second, different, amount, in response to the same pressure difference across the wall (or portion of wall). For example, the geometry of the chamber may be such that, for a given pressure difference, the expansion of the chamber is greater in the axial direction (e.g. along the longitudinal axis of the chamber) that the radial direction (e.g. perpendicular to the longitudinal axis of the chamber), or vice versa. The structure defining the chamber may be configured such that the distance moved by the or each chamber wall in response to a given change in the pressure difference varies around the perimeter of the chamber.

The structure defining the chamber may comprise a frame. The frame may be rigid. The frame may be configured to limit the expansion and/or contract of the chamber. The frame may be configured to limit the expansion and/or contraction of the chamber differently in different directions. For example, the frame may be configured to limit radial expansion of a chamber but not axial expansion of said chamber. It may be that the chamber is configured to only extend and/or contract along a single axis.

It may be that the seal body comprises a blade, and the seal assembly is configured such that, in use, the change in volume of the chamber causes the blade to move from a first position spaced apart from the discontinuity to a second position closer to the discontinuity. Thus, the response of the sealed chamber to a pressure difference may alter the behaviour of the seal body by moving a portion of the seal body (for example a blade) closer to a discontinuity thereby sealing or fairing the discontinuity more effectively.

The seal assembly may be configured such that, in use, the change in volume of the chamber causes a change in shape of at least a portion of the seal body. Thus, the response of the sealed chamber to a pressure difference may alter the behaviour of the seal body by changing the shape of the seal body. The change in volume may cause a deformation of the seal body by displacing a first portion of said body relative to another portion of the body. The seal may be configured such that expansion and/or contraction of the chamber causes a corresponding expansion and/or contraction of the body of the seal.

The chamber may be located within a portion of the seal body such that expansion of the chamber causes an expansion of said portion of the seal body, for example by stretching a portion of the seal body. Alternatively, it may be that the chamber is located externally to the seal body and is configured to apply a force (directly or via the linking mechanism) to the seal body so as to deform the seal body. For example, the chamber may be located adjacent to the seal body such that expansion of the chamber causes compression or bending of the seal body.

It will be appreciated that deformation of the chamber may cause both a deformation and a displacement of the seal body simultaneously. For example, in the case that the seal body is non-rigid, any displacement may also be accompanied by a deformation of the seal body.

The seal body may comprises a bulb, and the chamber may be located within the bulb such that expansion (and/or contraction) of the chamber causes an expansion (and/or contraction) of the bulb. In use, as the chamber expands it may force the walls of the bulb outwards thereby expanding the bulb. Thus, in use, expansion of the chamber as the aircraft gains altitude may cause the bulb to expand and thereby increase the engagement of the seal with the sides of an aerodynamic gap.

It may be that in response to changes in the ambient pressure relative to the internal pressure of the chamber the sealed chamber alters the resistance to deformation of the seal body. Providing a seal having a variable resistance to deformation may allow the seal to adapt to changes in the shape of the discontinuity in flight, and/or to move differently in response to a given force at different stages of the flight thereby increasing the versatility of the seal. It may be that any expansion of the chamber is limited such that the primary impact of a reduction in ambient pressure relative to the internal pressure is to increase the resistance of the chamber (and thereby the structure defining the chamber) to deformation. Thus, the chamber may become less compressible with increasing altitude. The seal assembly may be configured such that the increased stiffness (or reduced compressibility) of the chamber acts to alter the way in which the seal body deforms under the influence of a given force. The chamber may alter the resistance to deformation of the seal body by limiting the amount of deformation. That is to say, the stiffened/less compressible chamber may act as a rigid body that prevents further expansion of the seal body beyond a given point. Thus, the chamber (or the structure defining it) may act as a stop. The chamber may alter the resistance to deformation of the seal body by stiffening and/or reducing the compressibility of a portion of the seal body. Thus, the response of the chamber to a change in pressure difference may be to alter the resistance to deformation of the seal body.

The chamber may comprise a valve configured to allow air from the surrounding environment into and/or out of the chamber when the valve is open (and to seal the chamber when the valve is closed). Providing a valve may allow the internal pressure of the chamber to be equalised with the ambient pressure when the aircraft in on the ground. The valve may be configured to open when the pressure difference exceeds a threshold value. The valve may be configured to open automatically in response to the threshold being exceeded. Providing such a valve may enable the chamber pressure to be automatically equalised with the ground pressure (or cruising pressure) after each flight to compensate for any leakage. The valve may allow flow between the outside environment and the chamber in one direction only. Thus, the valve may be a one-way valve. The valve may be configured to automatically open when the pressure difference between the ambient pressure and the chamber pressure exceeds a certain threshold value. The valve may be a check valve. The threshold value may be the ambient pressure equaling and/or exceeding the internal pressure of the chamber. The threshold value may be the ambient pressure exceeding the internal pressure by a given amount.

The seal assembly may configured such that the chamber (and/or the structure defining the chamber) returns to its original shape and/or volume in the absence of a pressure difference. The chamber may be biased towards the original shape and/or volume. Thus, as the pressure difference reduces, the chamber may deform towards a shape having the given volume. The given volume may be a non-zero volume. Providing a resilient chamber that is biased to have a particular volume may facilitate equalisation of the chamber pressure with the ground pressure, particularly if the chamber has become compressed. The given volume may be the volume at which the internal pressure of the chamber is substantially equal to the standard sea level atmospheric pressure. The given volume may be referred to as the original volume.

The chamber and/or the structure defining the chamber may comprise a resilient member arranged to bias the chamber towards a shape providing the original volume, for example the original shape. The resilient member may be configured to expand the chamber in the event that the ambient pressure becomes greater than the internal pressure of the chamber. The resilient member may be configured to limit the compression of the sealed chamber in the event that the ambient pressure becomes greater than the internal pressure of the chamber. The resilient member may be located within the chamber. The resilient member may comprise a resilient porous body, for example a compressible foam body located within the chamber. The resilient member may comprise a spring.

The drag-inducing discontinuity may be formed between a first surface portion and a second surface portion. Thus, the aircraft assembly may comprise a drag-inducing discontinuity defined between first and second surface portions. The second surface portion may be mounted for movement relative to the first surface portion. The second surface portion may form part of a high-lift device or control surface, for example a flap, slat, aileron, spoiler, rudder or elevator. The first surface portion may form part of a surface panel, for example an upper or lower skin panel or shroud on the wing or tail assembly of an aircraft. Using the seal of the present invention with a movable element may allow the alteration in the behaviour of the seal to be synchronised with a change in position of the element by using the change in altitude. For example, as altitude increases and the flaps are retracted a blade may be pushed closer to the underside of a flap by the change in volume of the chamber. As altitude increases and the gap between a control surface and an adjacent surface reduces, the expansion of the chamber may be used to expand the bulb of a seal to increase sealing engagement with the sides of the gap.

The aircraft assembly may comprise a wing. The aircraft assembly may comprise a tail assembly.

According to a second aspect of the invention there is provided a seal assembly configured for use as the seal assembly (or seal) of the first aspect.

According to a third aspect of the invention, there is provided a method of altering the behaviour of a seal arranged to seal or fair a drag-inducing discontinuity on an aircraft, said seal comprising a seal body and an air-tight chamber, the method comprising the steps of: pressurising the air-tight chamber, and then varying the ambient pressure surrounding the chamber by varying the altitude of the aircraft, wherein the response of the air-tight chamber to changes in the ambient pressure relative to the internal pressure of the chamber alters the behaviour of the seal body.

The method may comprise the step of varying the ambient pressure by altering the altitude of the aircraft. The method may comprise varying the ambient pressure by climbing from sea (or ground) level to cruise altitude (or vice versa).

The method may comprise the step of pressurising the chamber. The pressurising step may be carried out while the aircraft is on the ground. The step of pressurising the chamber may comprise equalising the internal pressure of the chamber with the ambient pressure, for example the ground pressure.

The chamber may be pressurised to a first pressure. The first pressure may be greater than the cruising pressure (i.e. the ambient pressure at a typical cruise altitude). In that case, as the aircraft gains altitude after take-off the pressure difference will increase. Alternatively, the first pressure may be less than the cruising pressure. In that case, as the aircraft descends for landing the pressure difference will increase. The first pressure may be equal to the ambient pressure at ground level (i.e. the ground pressure). It will be appreciated that the ambient pressure at ground level can vary depending on the altitude of the runway and/or the weather conditions, but that the ambient pressure at ground level remains significantly higher than the ambient pressure at cruise altitude. For example, standard sea level atmospheric pressure is usually defined as 14.696 psi (101.325 kPa). Cruise altitude is typically between around 34000 feet and 40000 feet (10000 m and 12000 m). The ambient pressure at cruise is therefore between around 3.6 psi and 2.7 psi (24.8 kPa and 18.6 kPa). Accordingly, even with some variation of the ambient pressure at ground level there remains a significant pressure difference with respect to the ambient pressure at cruise altitude. If the seal is to be used with a high-lift device or control surface the altitude at which said device or surface is retracted and/or extended will also need to be taken into account. For example, flap retraction following take off from Toulouse occurs at 5000 feet (1500 m), and 12.2 psi (84.1 kPa) while flap retraction following take off from La Paz occurs at 20000 feet (6000 m), and 6.8 psi (46.9 kPa). As will be apparent to the skilled person, it is necessary to take into account the available pressure difference when designing the seal to ensure that the change in pressure difference has a sufficient impact on the behaviour of the seal body.

The volume of the air-tight chamber may vary as the ambient pressure surrounding the chamber varies. It may be that at sea (or ground) level the sealed chamber has a first volume. It may be that at cruise altitude the sealed chamber has a second, greater, volume. The method may comprise allowing the chamber to expand between the first and second volume as the aircraft gains altitude.

It may be that at sea (or ground) level the seal body has a first shape. It may be that at cruise altitude the seal body has a second, different, shape. Expansion of the chamber from the first volume to the second volume as the aircraft climbs to cruise altitude may alter the shape of the seal body from the first shape to the second shape. The method may comprise allowing the seal body to deform under the action of the chamber (and/or the structure defining the chamber). As discussed above, the seal body (or a portion thereof) may provide improved sealing and/or fairing in the second shape.

It may be that at sea (or ground) level the seal body is in a first position. It may be that at cruise altitude the seal body is in a second, different, position. Expansion of the chamber from the first volume to the second volume as the aircraft climbs to cruise altitude may move the seal body from the first position to the second position. As discussed above, the seal body (or a portion thereof) may provide improved sealing and/or fairing in the second position.

It may be that at sea (or ground) level the chamber (and the structure defining the chamber) has a first stiffness. It may be that at cruise altitude the chamber has a second, different, stiffness. For example, the chamber may compress by a greater amount in response to a given force at ground level than compared to cruise altitude. The change in ambient pressure as the aircraft climbs to cruise altitude may increase the stiffness (or reduce the compressibility) of the chamber from the first stiffness to the second stiffness. It may be that the increase in stiffness of the chamber increases the resistance to deformation of the seal body. The increased stiffness (or reduced compressibility) of the chamber may allow the structure defining the chamber to resist and/or limit the deformation of the seal body. It may be that at sea (or ground) level the seal body displaces by a first distance in response to a given force. It may be that a cruise altitude, the increased stiffness of the seal body causes the seal body to displace by a second, greater, distance in response to the same force. It may be that a cruise altitude, the increased stiffness of the seal body causes the seal body to deform less in response to the same force.

In the case that discontinuity is formed between a first surface portion and a second surface portion, the second surface portion forming part of a moveable control surface, the method may comprise contacting the seal with the control surface such that movement of the control surface between an extended and contracted position moves the seal between a first position and a second position in which the seal provides improved fairing and/or sealing of the discontinuity. For example, in the first position a portion of the seal body configured to fair the discontinuity, for example a blade, may be located further from the discontinuity that in the second position. In this case, the increase in stiffness of the seal body with altitude that may be provided using the air-tight chamber of the present invention may facilitate displacement of the seal by the control surface. In particular, the seal may be more flexible while the flaps are deployed but becomes stiffer as the flaps are retracted.

According to a fourth aspect of the invention there is provided a seal for use with an aerodynamic gap or step in the surface of an aircraft, the seal comprising a bulb containing an air-tight chamber defined by one or more flexible walls such that, in use, as the ambient pressure reduces relative to the internal pressure of the air-tight chamber, the air-tight chamber provides increased resistance to deformation of the bulb.

The air-tight chamber may comprise a bladder contained within a void in the bulb. Thus the chamber may be defined by a flexible wall.

The seal assembly may comprise an actuator arranged to move the seal from a first position to a second position by contacting the seal body, for example the bulb. The actuator may comprise a high-lift device or a control surface or other element mounted for movement during flight which defines, at least in part, the aerodynamic gap or step. Thus, the actuator may form part of a wing assembly on which the seal is mounted. The wing assembly may comprise an actuator arranged to move the seal from a first position to a second position by contacting the seal body, for example the bulb. Thus, the high-lift device or control surface may move the seal body, and the bladder may facilitate said movement by reacting the force exerted on the seal body by the high-lift device or control surface.

The seal may comprise a blade connected to the bulb, and movement of the seal from the first position to the second position may bring the blade closer to the surface of the aircraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 2A:
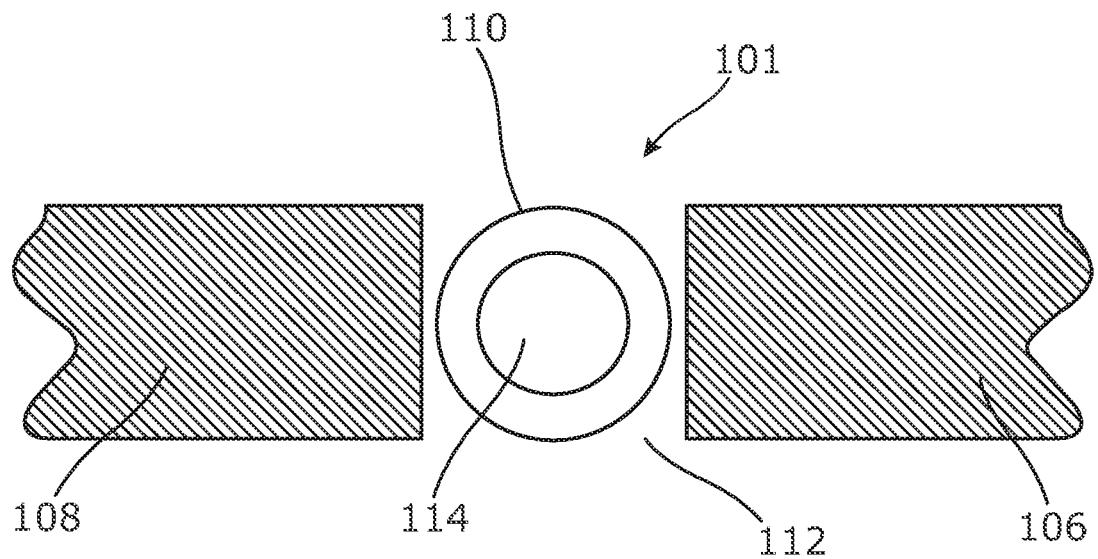
FIGS. 2 (a) and (b) show an aircraft seal according to a first example embodiment of the invention when the aircraft is at ground level and cruise altitude respectively.
Figure 2B:
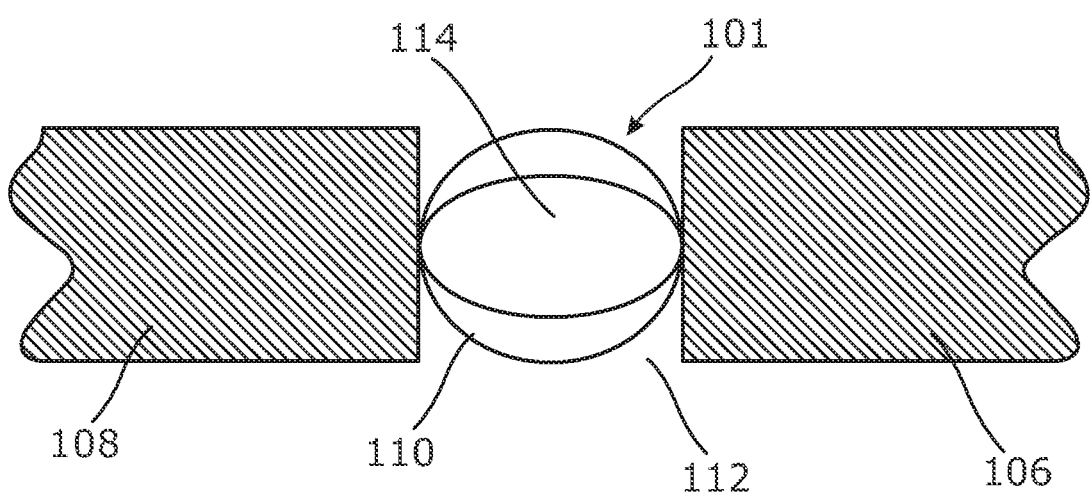

FIGS. 2 (a) and (b) show a seal 101 on an aircraft (not shown) in accordance with a first example embodiment of the invention when the aircraft is on the ground and at cruise altitude respectively. The seal comprises a bulb 110 which appears substantially circular when viewed in cross-section in FIG. 2(a), and is located in a gap 112 between a first surface panel 108 on the left, and a second surface panel 106 on the right. Contained within the bulb 110 is a bladder 114 which appears substantially circular, and concentric with bulb 110 when viewed in cross section in FIG. 2(a). In FIG. 2(a) the bladder 114 has a diameter X1 and is spaced apart from the inner surface of the bulb 110. The outer circumference of the bulb 110 is spaced apart from the edge of the surface panels 106, 108 on each side of the gap 112. In FIG. 2(b) the bladder 114 is oval when viewed in cross-section and has a major diameter X2 in the horizontal plane which is greater than X1. The bladder 114 is in contact with the inner surface of the bulb 110. The outer surface of bulb 110 is in contact with the edge of the surface panels 106, 108 on each side of the gap 112.

In use, when the aircraft is on the ground as shown in FIG. 2(a) the pressure $P_1$ within the bladder 114 is similar to the ambient pressure $P_a$ (it will be appreciated that the exact value will vary depending on the altitude of the airport in question). As the aircraft gains altitude, the ambient pressure $P_a$ drops. For example $P_a$ may drop from 101.325 kPa (14.696 psi) at ground level to 24.8 kPa (3.6 psi) at 10000 m (34000 ft). As $P_a$ reduces relative to $P_1$, the bladder 114 expands from the position shown in FIG. 2(a). As the size of bladder 114 increases it exerts a force on the inner surface of the bulb 110 causing the bulb 110 to deform outwards and therefore increasing the engagement between the bulb 110 and the surface panels 106, 108 on each side of the gap 112 as shown in FIG. 2(b). Seals in accordance with the present invention may therefore provide improved seal engagement, and thereby improved aerodynamic performance at cruising altitude, by exploiting the difference in ambient pressure between ground level and cruising altitude. Additionally, seals in accordance with the present embodiment may achieve increased engagement in a passive manner.

Figure 3A:
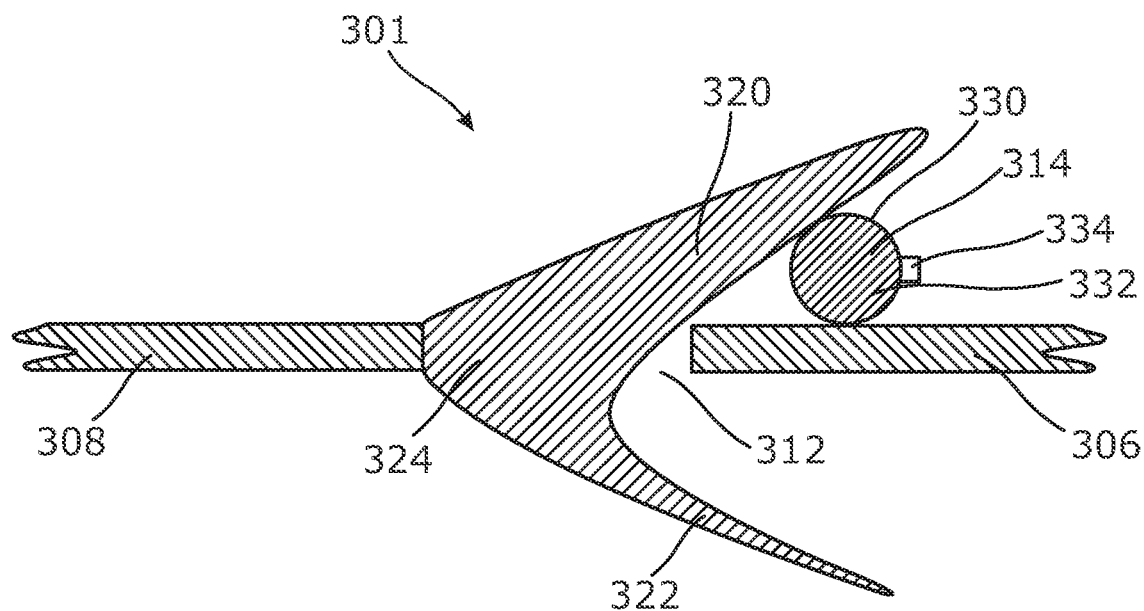
FIGS. 3 (a) and (b) show an aircraft seal according to a second example embodiment of the invention when the aircraft is at ground level and cruise altitude respectively.

FIGS. 3(a) and (b) show a seal 301 on an aircraft (not shown) in accordance with a second example embodiment of the invention when the aircraft is on the ground and at cruise altitude respectively. Only those aspects of the second embodiment which differ with respect to the first embodiment will be discussed in detail. Like reference numerals denote like elements. In contrast to the first embodiment, the seal 301 of the second embodiment comprises upper and lower blades 320, 322 joined together at an apex 324 located in the gap 312. The apex 324 of the seal 301 is joined to the left-hand skin panel 308 while the blades 320, 322 extend towards the right-hand side of FIG. 3(a), diverging either side of right-hand skin panel 306. The right-hand skin panel 306 therefore extends into the gap between the upper blade 320 and lower blade 322. A thin wall 330, which appears circular when viewed in cross-section in FIG. 3(a) defines the chamber 314, which contains a spherical body 332 made of porous foam material. The chamber 314 (and the structure 330 defining it) are located between the upper blade 320 and the upper surface of the right-hand skin panel 306, such that an upper portion of the wall 330 is in contact with the underside of the blade 320 while a lower portion of the wall 330 is in contact with the upper side of the skin panel 306. A one way check valve 334 extends through the wall 330.

Figure 3B:
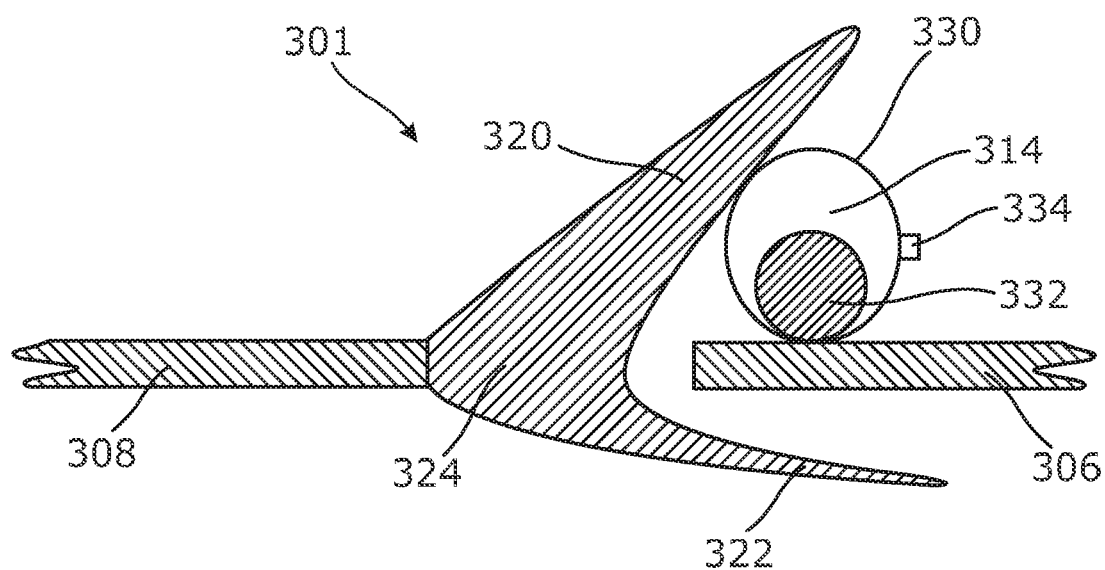

At ground level (see FIG. 3(a)) the lower blade 322 is spaced apart from the underside of skin panel 306 and the thin wall 230 is in contact with the spherical body 332. As $P_a$ reduces relative to $P_1$, the pressure difference across the thin wall 330 acts to stretch the wall 330 and the chamber 314 expands from the position shown in FIG. 2(a). As the chamber 314 expands it presses on the underside of the upper blade 320, displacing the blade 320 upwards, and thereby moving the lower blade 322 upwards also. Accordingly, at cruise altitude as shown in FIG. 3(b), the lower blade 322 has moved closer to the underside of the right-hand skin panel 306 and provides improved fairing or sealing of the gap 112 and edge of the panel 108 in comparison with FIG. 3(a). Accordingly, seal assemblies in accordance with the present example embodiment may use a change in volume to change the behaviour of the seal by moving a portion of the seal into a better fairing position.

In use, the valve 334 is closed while the aircraft is in flight, thereby maintaining the chamber 314 in an air-tight configuration. On the ground, if the ambient pressure $P_a$ is greater than the pressure $P_1$ in the chamber 314 (for example because of minor leakage, or because the ground pressure is lower than at a previous ground location), the one-way check valve 334 opens and allows air to flow into the chamber 314 thereby equalising $P_1$ with $P_a$. The foam body 332 acts to prevent the chamber 314 becoming overly compressed if $P_a$ exceeds $P_1$. Accordingly, seals in accordance with the present invention may be automatically replenished, such that the system remains effective over a prolonged period. While the present example embodiment uses resilient foam to bias the chamber towards its original volume, other means of biasing the chamber will be apparent to the skilled man.

Figure 4:
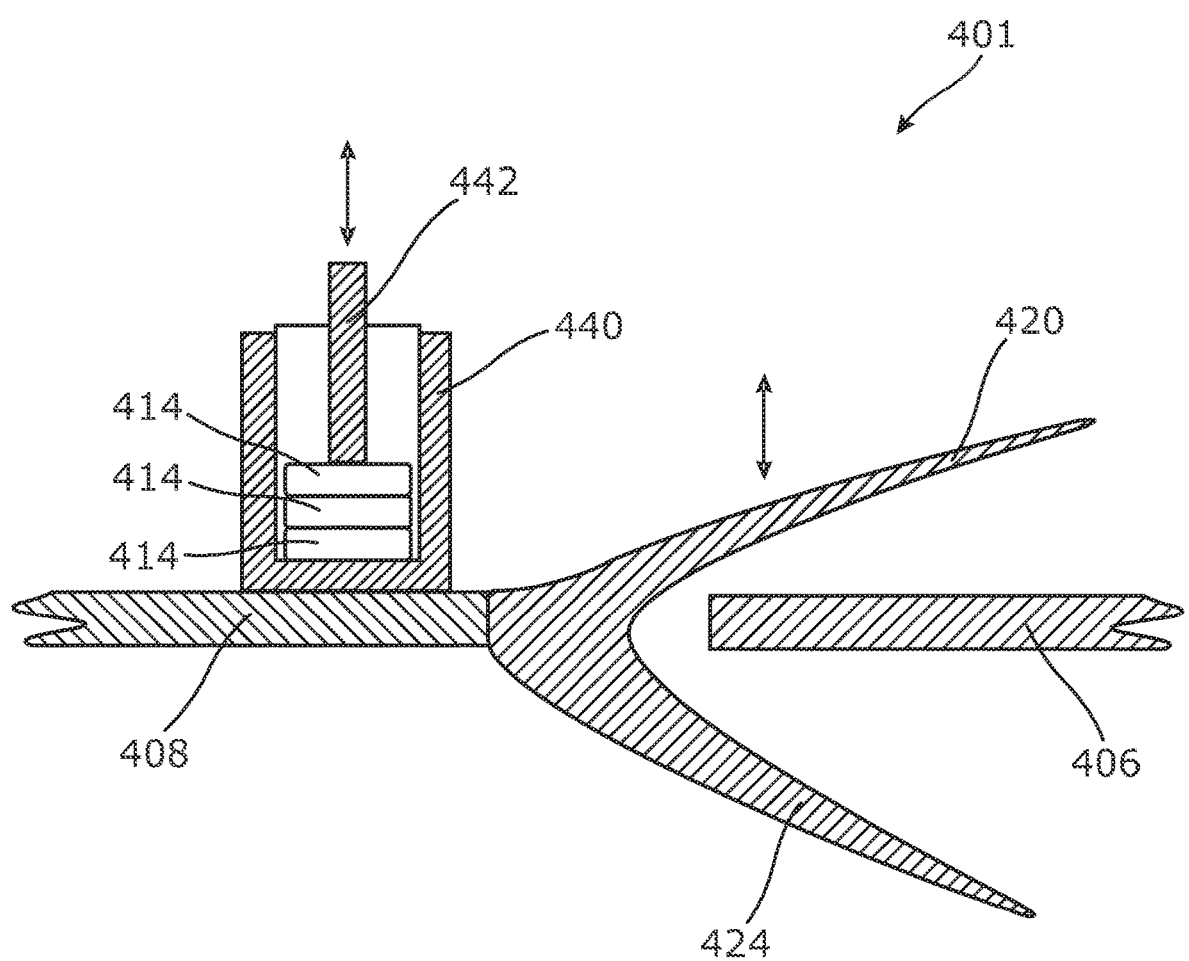
FIG. 4 shows an aircraft seal according to a third example embodiment of the invention.

FIG. 4 shows a seal 401 in accordance with a third example embodiment of the invention. Only those aspects of the third embodiment which differ with respect to the second embodiment will be discussed in detail. Like reference numerals denote like elements. The seal 401 of the third embodiment comprises a plurality of flexible cells 414 which appear rectangular when viewed in cross-section in FIG. 4. The cells 414 are stacked one atop the other within a rigid cylindrical sleeve 440. At a first end the sleeve 440 is attached to the left-hand skin panel 408. At the other end of the sleeve 440 a connecting rod 442 is located on top of the cells 414 and protrudes from the end of the sleeve 440. The distal end of the rod 442 contacts to the upper blade of the seal 420 via a linking mechanism (not shown).

In use, the flexible cells 414 expand as the aircraft gains altitude and the ambient pressure decreases. As the cells 414 are constrained by the sleeve 440, the expansion is directed along the longitudinal axis of the sleeve 440. The expansion of the cells 414 pushes the rod 442 upwards out of the sleeve 440 and, via the linking mechanism, exerts a force on the upper blade of the seal 420. The force exerted on the upper blade 420 causes the lower blade 424 to move upwards and into contact with the underside of the right-hand skin panel 406. When the aircraft descends the cells 414 contract, and the lower blade 424 is moved downwards.

In seals in accordance with the third example embodiment the seal assembly is constructed such that the deformation of the chambers is anisotropic (with greater longitudinal expansion but limited radial expansion). Accordingly, seals in accordance with the third embodiment may provide a greater displacement for a given pressure difference and size of cavity.

Figure 1:
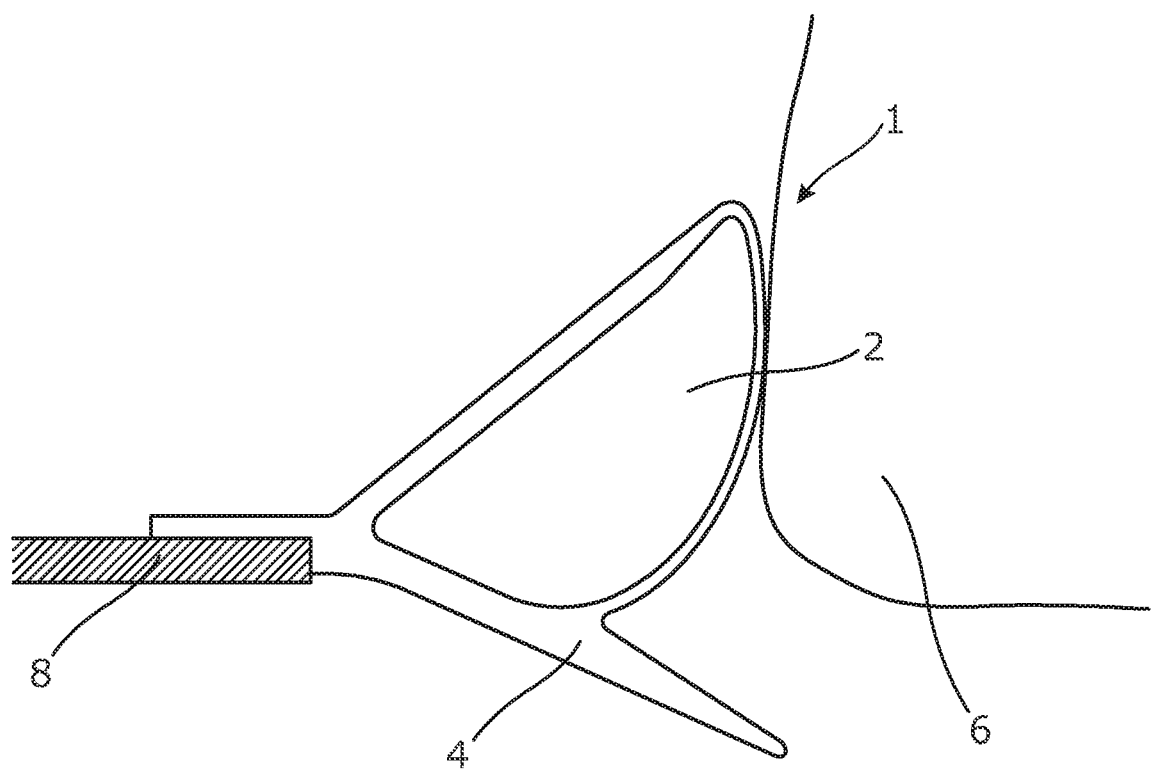
FIG. 1 shows a prior art aircraft seal.
Figure 5A:
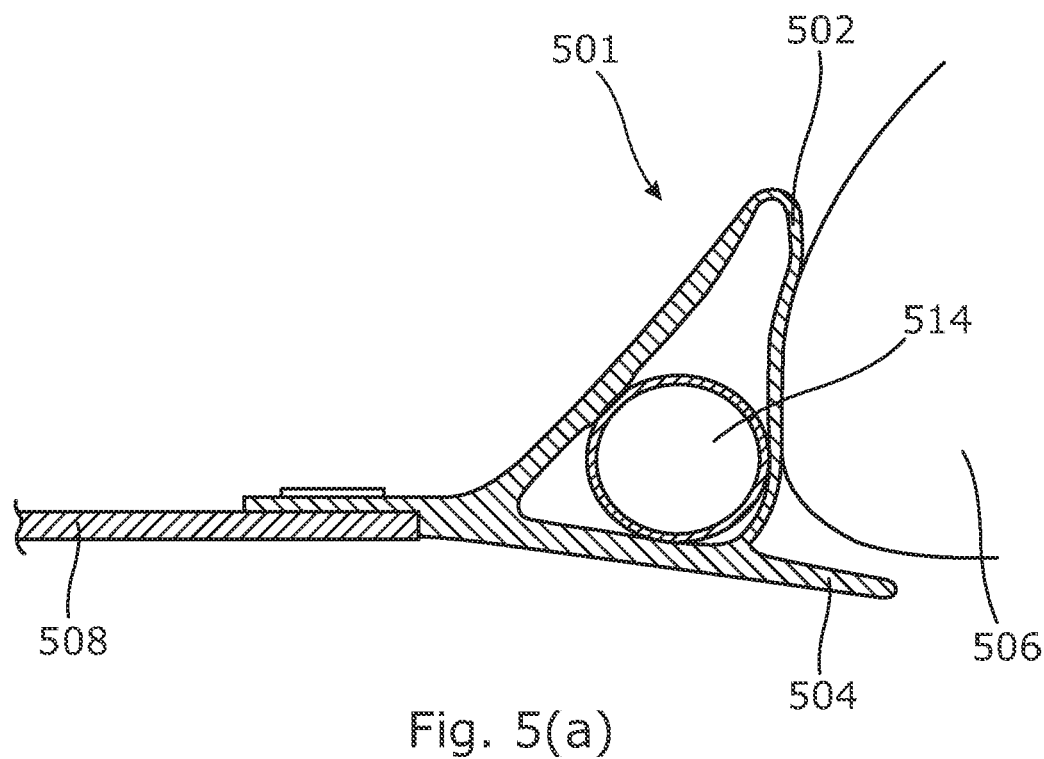
FIGS. 5 (a) and (b) show an aircraft seal according to a fourth example embodiment of the invention when the aircraft is at ground level and cruise altitude respectively.
Figure 5B:
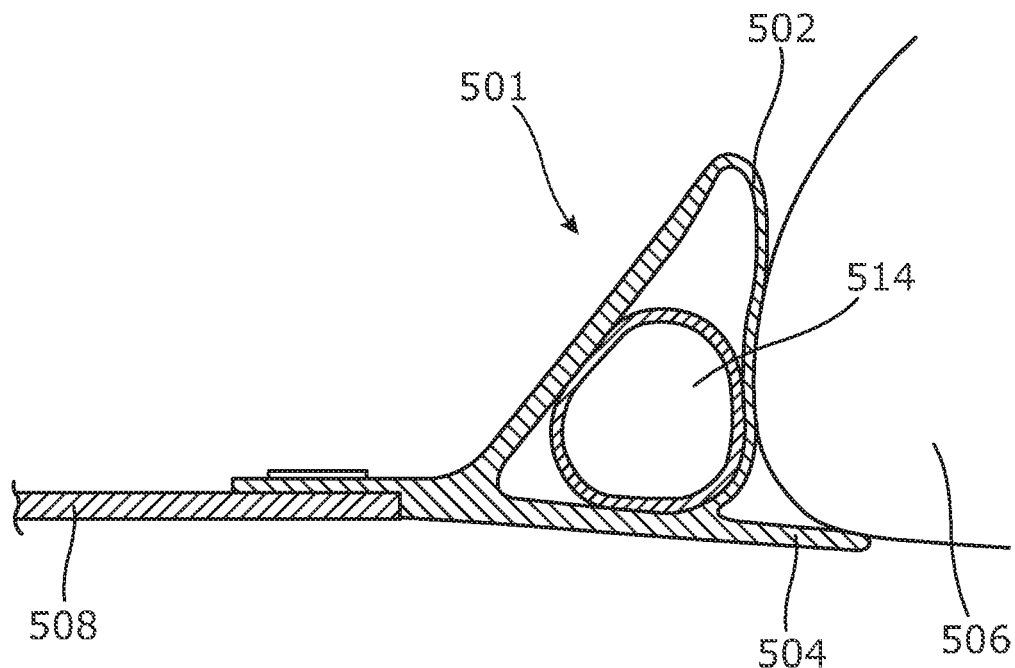

FIGS. 5(a) and (b) show a seal 501 in accordance with a fourth example embodiment of the invention when the aircraft is on the ground and at cruise altitude respectively. The blade 504 and bulb 502 of the seal 501 of the fourth embodiment have a similar shape and configuration to the prior art seal of FIG. 1, and only those aspects of the fourth example embodiment which differ with respect to the seal of FIG. 1 will be discussed in detail. Like reference numerals denote like elements. The bulb 502 of the seal 501 includes a flexible chamber 514 located within the bulb 514. Both FIGS. 5(a) and (b) show the flap 506 in the retracted position, in which position the flap 506 compresses the bulb 502. In FIG. 5(a), when the aircraft is on the ground, the blade 504 is spaced apart from the underside of the flap 506. In FIG. 5(b) when the aircraft is at cruise altitude the blade 504 is in contact with the underside of the flap 506.

In use, as the flap 506 retracts, the chamber 514 expands but to a lesser degree than in the other embodiments. Once the limit of expansion of the chamber 514 has been reached, a continued reduction in ambient pressure results in the chamber 514 becoming 'stiffer' i.e. more resistant to compression. As a consequence of this increased stiffness, when the flap 506 retracts at altitude, the bulb 502 within which the chamber 514 is located does not deform to the same degree as when the flap 506 retracts on the ground. The increased stiffness of the bulb 502 at high altitude allows it to better react the force from the flap 506, and results in a greater movement of the blade 504 for a given movement of the flap 506 in comparison to the movement that would occur when the flap 506 is retracted at ground level. Accordingly, when the flap 506 is retracted at altitude the blade 504 is brought closer to the gap 512 because the chamber 514 causes the stiffness of the seal to change with altitude. Seals in accordance with the fourth embodiment may therefore provide an improved aerodynamic performance by changing the stiffness of the seal. It will be appreciated that such a variable stiffness may offer advantages over simply increasing the stiffness of the seal, which may increase the risk of entrapment or jamming and change the load distribution in the region of the discontinuity.

Figure 6:
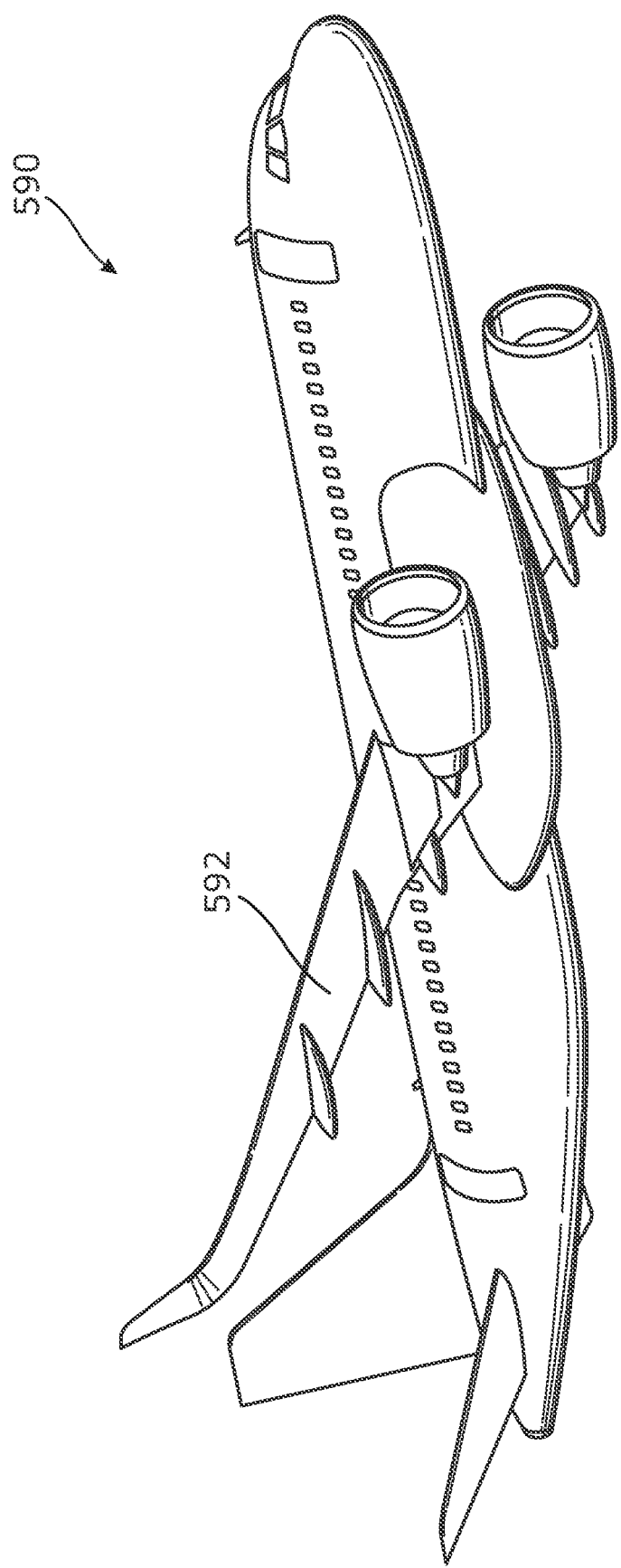
FIG. 6 shows an aircraft including a seal in accordance with the fourth example embodiment.

FIG. 6 shows an aircraft 590 including a seal 501 in accordance with the fourth example embodiment on the underside of a wing 592.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above embodiments describe the use of a seal with an aerodynamic gap or step. It will be appreciated that seals in accordance with the present invention may be used to seal and/or fair a wide variety of discontinuities.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft airfoil assembly having a drag-inducing discontinuity, and a seal assembly attached to an airfoil structure adjacent the discontinuity and the seal assembly comprising a seal body arranged to fair and/or seal the discontinuity, the seal assembly further comprising an air-tight sealed chamber, the air-tight sealed chamber being pressurized such that, in response to changes in ambient pressure as the aircraft assembly changes altitude, a difference in the ambient pressure and an internal pressure in the air-tight sealed chamber alters a behavior of the seal body.

2. The aircraft airfoil assembly according to claim 1, wherein the volume of the air-tight sealed chamber varies in response to changes in the ambient pressure relative to the internal pressure of the air-tight sealed chamber and said variation in volume alters the behavior of the seal body.

3. The aircraft airfoil assembly according to claim 2, wherein the seal assembly is configured such that the variation in volume of the air-tight sealed chamber causes a displacement of at least a portion of the seal body.

4. The aircraft airfoil assembly according to claim 2, wherein the seal body comprises a blade, and the seal assembly is configured such that, in use, the change in the volume of the air-tight sealed chamber causes the blade to move from a first position spaced apart from the discontinuity to a second position closer to the discontinuity.

5. The aircraft airfoil assembly according to claim 2, wherein the seal assembly is configured such that, in use, the change in the volume of the air-tight sealed chamber causes a change in shape of at least a portion of the seal body.

6. The aircraft airfoil assembly according to claim 2, wherein the seal body comprises a bulb, and the sealed chamber is located within the bulb such that expansion of the air-tight seal chamber causes an expansion of the bulb.

7. The aircraft airfoil assembly according to claim 2, wherein the air-tight seal chamber is configured to return to an original shape in absence of a pressure difference between the internal pressure and the ambient pressure.

8. The aircraft airfoil assembly according to claim 2, wherein a structure defining the air-tight sealed chamber is configured such that the degree of expansion in response to a given variation of the ambient pressure relative to the internal pressure of the air-tight sealed chamber varies around the perimeter of the air-tight sealed chamber.

9. The aircraft airfoil assembly according to claim 1, wherein in response to changes in the ambient pressure relative to the internal pressure of the sealed chamber, the air-tight sealed chamber alters a resistance to deformation of the seal body.

10. The aircraft airfoil assembly according to claim 1, wherein the seal assembly comprises a valve configured to automatically open to allow air to enter the air-tight sealed chamber in response to the difference between the internal pressure in the air-tight sealed chamber and the ambient pressure exceeding a threshold value.

11. A seal assembly configured for use as the seal assembly of claim 1.

12. A method of altering the behavior of a seal arranged to seal or fair a drag-inducing discontinuity on an aircraft airfoil assembly, said seal comprising a seal body and an air-tight sealed chamber, wherein the seal body is attached to a structure of the airfoil assembly adjacent the discontinuity, the method comprising the steps of:
   pressurizing the air-tight sealed chamber with air at atmospheric pressure while the aircraft is at ground level, and
   then reducing ambient pressure surrounding the air-tight sealed chamber by moving the aircraft from the ground level to a flight cruising altitude, wherein a response of the air-tight sealed chamber to the reduction in the ambient pressure relative to an internal pressure of the air-tight sealed chamber alters the behavior of the seal body.

13. The method according to claim 12, wherein the air-tight sealed chamber has a first volume at ground level and a second, greater, volume at cruise altitude, and the method comprises allowing the air-tight sealed chamber to expand as the aircraft gains altitude.

14. The method according to claim 13, wherein expansion of the air-tight sealed chamber from the first volume to the second volume alters a shape of the seal body from a first shape to a second, different, shape.

15. The method according to claim 13, wherein expansion of the chamber from the first volume to the second volume alters the position of the seal body from a first position to a second, different, position.

16. The method according to claim 12, wherein the compressibility of the air-tight sealed chamber reduces as the aircraft moves between ground level and cruise altitude, and said reduction in compressibility increases an ability of the seal body to resist deformation.

17. The method according to claim 12, wherein the method comprises pressurizing the air-tight sealed chamber such that the internal pressure of the air-tight sealed chamber is substantially equal to the ambient pressure at ground-level.

18. A seal for use with an aerodynamic gap or step in a surface of an aircraft airfoil, the seal comprising:
   a bulb fixed to a structure of the aircraft airfoil and spanning the gap or step, wherein the bulb contains an air-tight sealed chamber defined by one or more flexible walls such that, in use, as ambient pressure reduces relative to an internal pressure of the air-tight sealed chamber, the air-tight sealed chamber provides increased resistance to deformation of the bulb.

19. A seal for use with an aerodynamic gap or step in a surface of an aircraft, the seal comprising a bulb containing an air-tight chamber defined by one or more flexible walls such that, in use, as ambient pressure reduces relative to an internal pressure of the air-tight chamber, the air-tight chamber provides increased resistance to deformation of the bulb, wherein the air-tight chamber comprises a bladder contained within a void in the bulb.

20. A seal assembly for use with an aerodynamic gap or step in the surface of an aircraft comprising:
   a seal including a bulb containing an air-tight chamber defined by one or more flexible walls such that, in use, as ambient pressure reduces relative to an internal pressure of the air-tight chamber, the air-tight chamber provides increased resistance to deformation of the bulb, and
   an actuator arranged to move the seal from a first position to a second position by contacting the bulb.

21. A wing assembly including the seal assembly according to claim 20, where the actuator comprises a control surface or high-lift device which forms part of the wing, and which defines, at least in part, the aerodynamic gap or step.

22. The wing assembly according to claim 21, wherein the seal comprises a blade extending away from the bulb, and wherein movement of the seal from the first position to the second position brings the blade closer to the aerodynamic gap or step.

* * * * *